United States Patent [19]

Konopka

[11] 3,885,876
[45] May 27, 1975

[54] OPTICAL CHROMATIC DISPLAY FOR NAVIGATIONAL GUIDANCE

[75] Inventor: John P. Konopka, West Chester, Pa.

[73] Assignee: Burroughs Corporation, Detroit, Mich.

[22] Filed: Dec. 26, 1973

[21] Appl. No.: 427,497

[52] U.S. Cl. .................. 356/153; 356/172; 340/26
[51] Int. Cl. .......................................... G01b 11/26
[58] Field of Search ............. 356/153, 172; 340/26; 244/114 R; 114/43.5

[56] References Cited
UNITED STATES PATENTS

| | | | |
|---|---|---|---|
| 2,991,743 | 7/1961 | Ogle | 356/172 X |
| 3,012,224 | 12/1961 | Ferguson | 340/26 |
| 3,138,779 | 6/1964 | Murray et al. | 340/26 |
| 3,279,406 | 10/1966 | Ricketts et al. | 340/26 X |
| 3,767,309 | 10/1973 | Brown et al. | 356/172 X |
| 3,843,263 | 10/1974 | Snead | 356/153 |

*Primary Examiner*—Ronald L. Wibert
*Assistant Examiner*—Paul K. Godwin
*Attorney, Agent, or Firm*—Francis A. Varallo; Edward J. Feeney, Jr.; Kevin R. Peterson

[57] ABSTRACT

A system is described which provides a chromatic visual display of information to enable an observer to pursue an optimum path of travel. While particularly suited for the guidance of aircraft to a safe landing on an area of restricted size, the display device is useful in other applications, such as in the navigation of ships through channel waterways. The system employs in combination, a lens system, light source and translucent color field member to provide a display in which the entire face portion thereof appears to the observer to change color as he shifts his point of observation. The desired path of travel is indicated to the observer as a particular preselected color, and he need only maintain an attitude which permits him to see this color in order to pursue said path.

6 Claims, 9 Drawing Figures

PATENTED MAY 27 1975  3,885,876

SHEET 3

OPTICAL CHROMATIC DISPLAY FOR NAVIGATIONAL GUIDANCE

CROSS REFERENCE TO RELATED APPLICATIONS

The present display device is related to the optical display devices described and claimed in application Ser. No. 674,228 which issued as U.S. Pat. No. 2,991,743, "Optical Device for Image Display," by James A. Ogle, and application Ser. No. 164,350 which issued as U.S. Pat. No. 3,729,262, "Optical Lens Docking System," by Edwin E. Snead and Jay B. Pitkow. These patents are assigned to the same assignee as the present application.

BACKGROUND OF THE INVENTION

In the reference Ogle patent an optical device is described for displaying the image of reference objects to an observer. More specifically, the device is employed as an optical glide path indicator for visually indicating to a pilot the proper glide angle for the safe landing of an aircraft on an area of restricted size. Such an area might be the flight deck of an aircraft carrier.

In connection with the optical system of the reference Ogle patent, an assembly is provided comprising a plurality of cells, each cell having reference lamps and lenses so disposed with respect to one another that an image of the reference lamps is produced. In terms of aircraft landing, the image of the lamps seen by the pilot is a horizontal bar of light which appears to move up or down depending upon the aircraft's angle of approach. Associated with the assembly but external thereto are fixed rows of lights which establish a datum line. The correct glide angle is indicated by the visual alignment of the bar of light with the datum line. Having made the necessary adjustments in his angle of descent, the pilot is required only to achieve the proper touch-down point for a safe landing.

Although the Ogle system as depicted in the reference patent provides a visible fan shaped horizontal bar of light, it lacks the azimuth information required by the pilot to align the center line of the aircraft with that of the landing area. The present invention may be employed either as an adjunct to the Ogle system to provide a fairly precise means of transmitting visual azimuth position information, or alternatively in one embodiment as a separate system providing both glide-slope and center line alignment information.

The optical display device described and claimed in the Snead et al patent utilizes Fresnel lenses and ribbed lenticulars positioned with respect to light sources to create information for accurately docking or parking aircraft and other vehicles. Such information provides, among other things, accurate center line steering. For the latter, the display device provides a vertical bar of light which appears to move in a horizontal direction as the observer moves to the right or left of the desired center line approach path. Alignment of the bar with a stationary vertical datum marker indicates alignment with the center line.

The present system may be utilized to provide center line alignment, and the display provided thereby is useful at considerable distances where the alignment of a moving bar of light with a datum marker may not be feasible. The observer views a display in which the entire face appears to glow brightly in a particular color. The color observed by the viewer is a function of his attitude or position with respect to the display. Observation of a preselected color is indicative of center line alignment, and this color will remain visible to the observer if he maintains a prescribed path of travel. Deviation from the path is signalled by a change in color of the display face.

SUMMARY OF THE INVENTION

In accordance with the present invention there is provided a display device using a lens system, light source and color field member to provide a chromatic display for aiding an observer to pursue a prescribed path of travel. In one embodiment of the invention, a lens system of cylindrically ribbed lenticulars may be utilized in the device to provide either azimuth or height (glide-slope) information. The color field member comprises identical sets of translucent color film strips, each set having a plurality of colors. The sets are mounted in repetitive fashion behind the lenticulars at a distance corresponding approximately to the focal point of the individual cylindrical lenses. The axes of the color film strips are oriented in the same direction as those of the lenticular ribs. Simultaneous illumination of all of the color film strips by at least a single light source placed behind the strips causes the entire display face (which is the lens system pupil) to appear to an observer to glow in one of the film colors of the set. The actual color seen by the observer is a function of his line of sight to the display. In a display in which the axes of the ribbed lenticulars are mounted vertically, azimuth (horizontal) information is provided, whereas if the lenticular axes are horizontal, height information along a vertical plane is presented to an observer.

Another embodiment of the invention contemplates the use of a converging lens such as a Fresnel, in place of the ribbed lenticulars for the lens system. A unitary translucent color field member capable of providing a plurality of colors is placed at substantially the focal point of the lens and is illuminated by a light source. Such a system is capable of providing in a single display, color changes in the Fresnel system pupil which indicate to an observer, deviations from a prescribed path both in the horizontal and vertical directions.

Other features of the invention will become more fully apparent in the detailed description of the display device and its mode of operation which follow.

DESCRIPTION OF THE PREFERRED EMBODIMENTS

Figure 1:
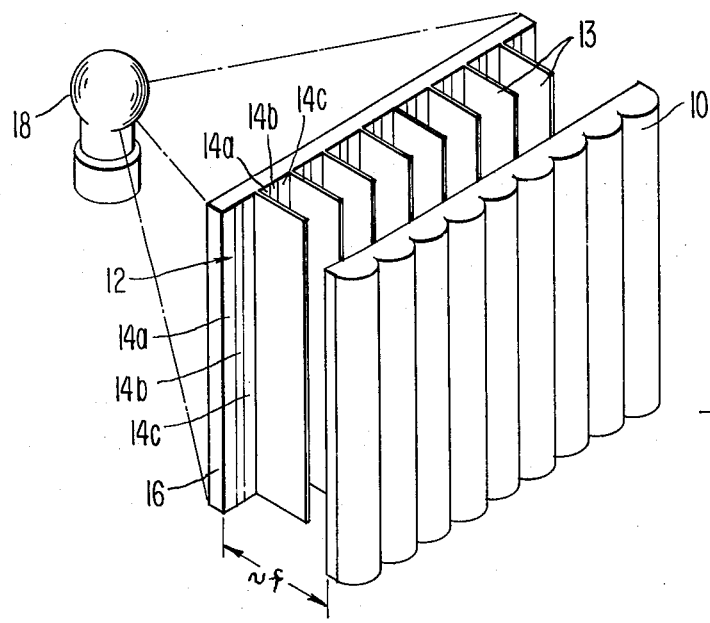
FIG. 1 is a diagrammatic illustration of a system embodiment of the present invention employing cylindrically ribbed lenticulars

FIG. 1 illustrates in diagrammatic form the components of a display device comprising a lens system of cylindrically ribbed lenticulars 10, a color field member 12 comprising sets of color strips 14a, 14b and 14c arranged on a substrate 16 and positioned at a distance corresponding to the approximate focal point, $\sim f$, of the lenticulars, and a light source 18 for back lighting the color strips.

The lenticular lens 10 (sometimes characterized functionally as a lenticular spreader) may be described as a fused assemblage of a plurality of cylindrical lenses. The cylindrically ribbed pieces illustrated are assumed to be clear and colorless and the axes of the ribs may be mounted vertically as in FIG. 1 for azimuth information, or horizontally as will be considered hereinafter in connection with FIG. 4 for vertical or glide slope information.

The action of the cylindrically ribbed lenticulars can be considered as that of a sequence of cylindrical lenses or prism angles with sufficiently frequent repetition that they appear to the observer to be continuously adjacent. In a plane perpendicular to the rod axis, each cylindrical lens exhibits the qualities of a circular lens and has, for example, normal magnification and dispersion. On the other hand, in a plane parallel to the rod axis, the cylindrical lens exhibits only those properties associated with common plate glass. Thus, if a "pinpoint" light source is positioned behind a cylindrical lens at its approximate focal point and is observed from some distance in front of the lens, the image of the light source is seen as a fine line of light across the width of the lens. If the apparent dimension of the light source is now increased in the same direction as the axes of the cylindrical ribs, such as by the use of a backlighted slit placed at substantially the focal point of the lens, the observer will see the entire area of the cylindrical lens illuminated, provided that the observer and the slit are at the center line of the lens. If the observer deviates from the center line, the image of the light source will no longer be apparent because the center of the focal cone of the lens will move through the same angle as the deviation and will not be focused upon the light source.

In accordance with the invention and as seen in FIG. 1, the slit providing the light image is replaced by a translucent field member 12 of different colors. In practice, the member 12 may be comprised of individual color film strips, 14a, 14b and 14c mounted or otherwise suitably affixed to a glass or plastic substrate 16, or alternately the latter substrate may be molded or formed with the desired pigment to achieve the required color pattern. The central color region 14b which may be amber is narrower than the adjacent color regions 14a and 14c which may be green and red respectively. The longitudinal center line of each amber strip 14b is aligned exactly with the center line of the cylindrical lens with which it is associated. The substrate 16 bearing the color film strips lies in a plane parallel to the back surface of the ribbed lenticular 10 and at a distance corresponding to the approximate common focal point ($\sim f$) of the cylindrical lenses. As seen in FIG. 1, each of the cylindrical ribs has associated therewith, the same color pattern oriented as described hereinbefore. Opaque vane-like projections 13 serving as light shades, are placed between adjacent sets of color strips. This prevents the observer from seeing through any given lens, a color pattern derived from a set of color strips not associated with that lens, as may be the case for extremely wide viewing angles.

Figure 2:
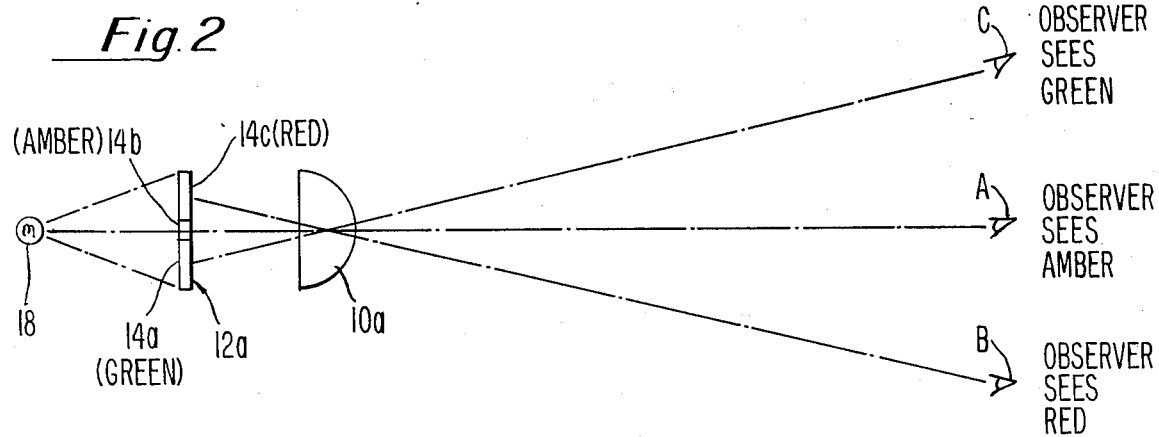
FIG. 2 is a simplified optical schematic depicting in plan view of the changing chromatic display seen by the observer at a distance, as he shifts his line of sight to the lenticulars.

FIG. 2 is a simple optical schematic depicting a single cylindrical lens 10a and tri-color film strips 14a (green), 14b (amber) and 14c (red) backlighted by light source 18. At point A, the observer sees the entire lens as an amber glow, while at points B and C, to the left and right of the lens, he sees the entire surface as red and green respectively. In terms of the plurality of cylindrical cells making up the lenticular system of FIG. 1, the observer will see the entire lenticular pupil illuminated in one of the above mentioned colors depending upon his observation point.

Figure 3:
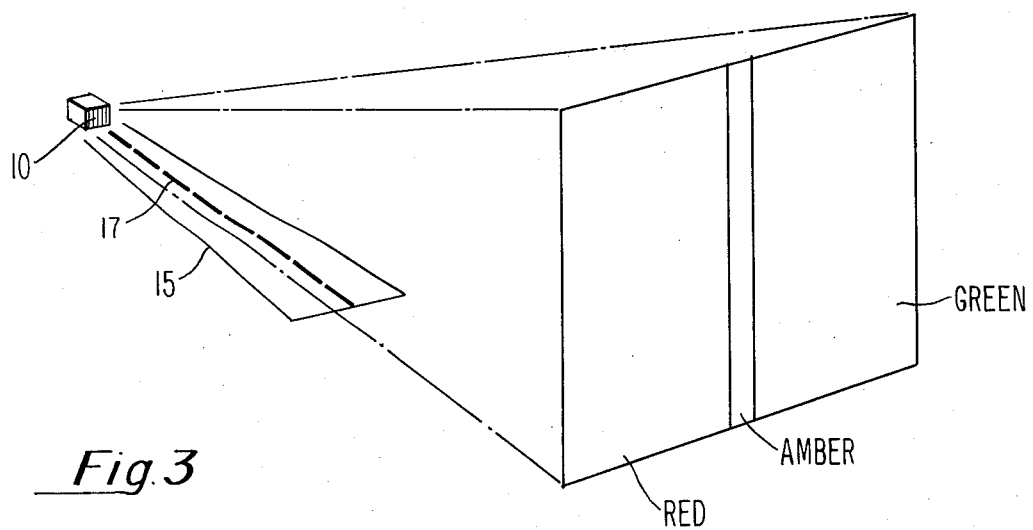
FIG. 3 is a spatial projection of the system depicted in FIG. 1 used for azimuth guidance during aircraft landing.

FIG. 3 is a spatial projection of the lenticular system of FIG. 1 as it applies to providing the azimuth information needed by a landing aircraft. It is in this application that the display device may be used in conjunction with the glide-slope indicator of the reference Ogle patent. Thus, assuming that the display device of FIG. 1 is suitably positioned on a landing area 15 facing an approaching aircraft preparing to land, the pilot is directed to the proper azimuth attitude by merely observing the color of the light emanating from the lenticulars. As seen in FIG. 3, when the direction of his approach is on the exact center line 17 of the runway he will see an amber light derived from color strips 14b, and as described hereinbefore, he will suddenly see red or green light from the same lens (as a result of strips 14c and 14a) if his approach deviates to the left or right.

Figure 4:
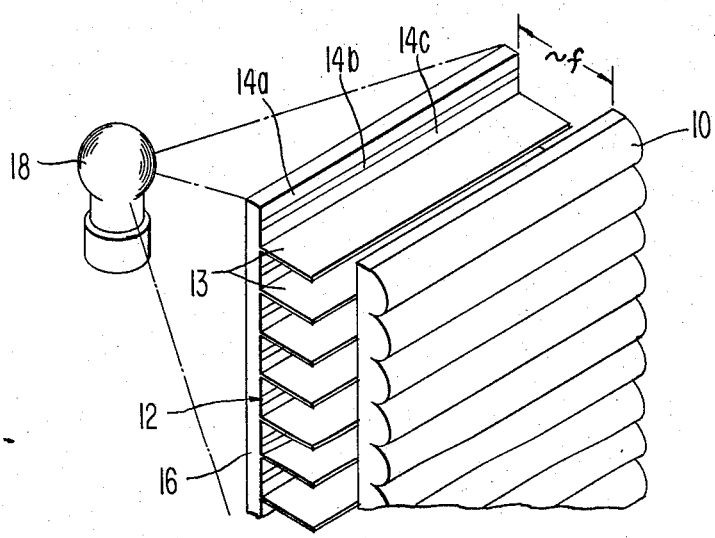
FIG. 4 is a partial diagrammatic illustration of a system similar to that of FIG. 1 but oriented to provide height or glide-slope information.
Figure 5:
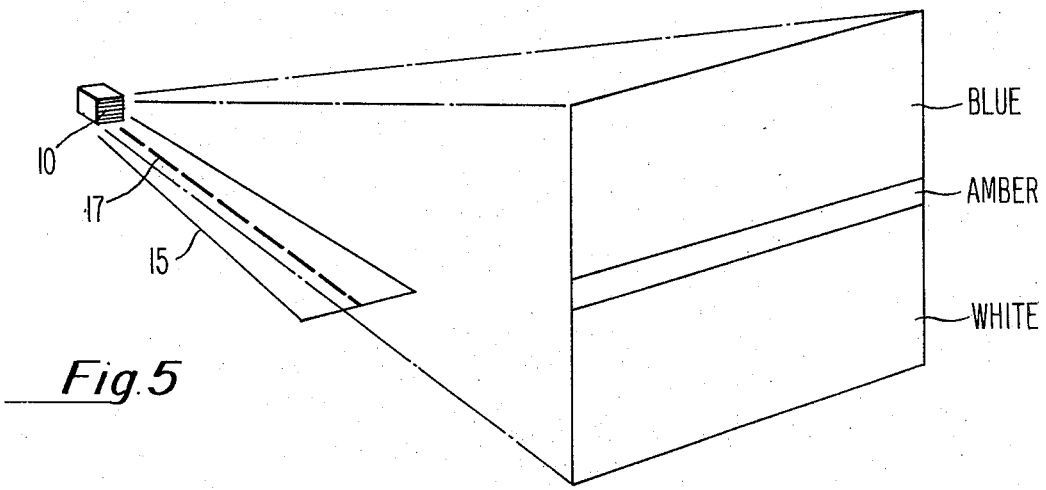
FIG. 5 is a spatial projection of the system of FIG. 4 used for glide path guidance during aircraft landing.

If it is desired to provide visual information in a vertical plane, such as glide-slope information, the system of FIG. 1 may be easily altered as seen in FIG. 4 to achieve this effect. The ribbed lenticulars 10 and the color field member 12 are rotated clockwise as a unit 90°, so that the axes of the ribs are horizontal as seen by the observer. The color film strips are maintained at a distance behind the lenticulars corresponding substantially to the focal point of the lenses. The same film colors may be used if the display is to be employed by itself for glide-slope information without benefit of the aforementioned azimuth display. However, it is obvious that the glide-slope display could be used advantageously with the first to provide complete aircraft landing information. In this case, the second (glide-slope) display could use the same central color (amber, for example) for strip 14b but the adjacent colors of strips 14a and 14c should be different. Assuming that white and blue are chosen respectively for the latter colors, the spatial projection of the display would be that seen in FIG. 5. As the pilot of the oncoming aircraft approaches landing area 15 having center line 17, he sees a blue color display if his approach is too high, amber, when on an optimum rate of descent and on glide path, and white when the approach is too low. In summary, by viewing both displays concurrently, or repetitively in sequence, the pilot receives both the azimuth and glideslope information required for a safe landing.

Figure 6:
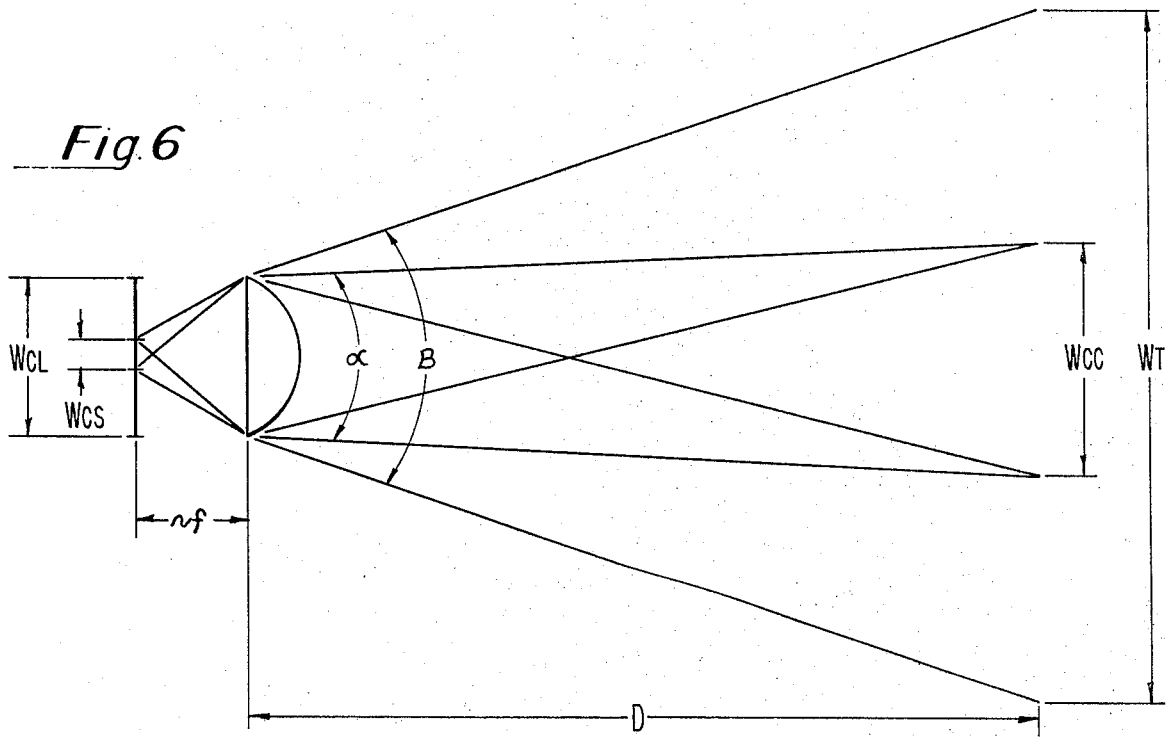
FIG. 6 is a plan presentation of the various parameters, which enter into the design of the system of FIG. 1.

With reference to FIG. 6 it is believed helpful at this point in the description of the invention to list the important parameters pertinent to the design of the system. It should be emphasized however, that the following parameters may vary according to the materials, design or application, and are included solely for purposes of example, and should in no way be considered limitative of the invention described and claimed herein.

A typical ribbed lenticular utilized in the present system has the following characteristics:

Total width — 12.5 inches
Total height (along a rib axis) — 10 inches
Number of cylindricals — 42
Width of the individual cylindrical — 0.3 inch
Radius of curvature of cylindrical — 0.25 inch
Thickness of lenticular — 0.25 inch
Focal length ($f$) of individual cylindrical — 0.5 inch In FIG. 6, the parameters depicted are defined as follows:
D — viewing distance from the display
$Wcs$ — width of the central color strip
$Wcl$ — width of the cylindrical
$Wcc$ — width of the central projected cone at distance D
$Wt$ — total viewing width at distance D
$\alpha$ — total angle of the central cone
$\beta$ — total system viewing angle If the width of the central color strip, $Wcs$ is chosen to be 0.02 inch, and the color film members are placed substantially at the focal distance ($\sim f$) from the cylindrical, then at a distance, D, of 1,000 feet from the display:
$Wcc$ = 40 feet
$Wt$ = 600 feet
$\alpha$ = 1.8°
$\beta$ = 34°

Figure 7:
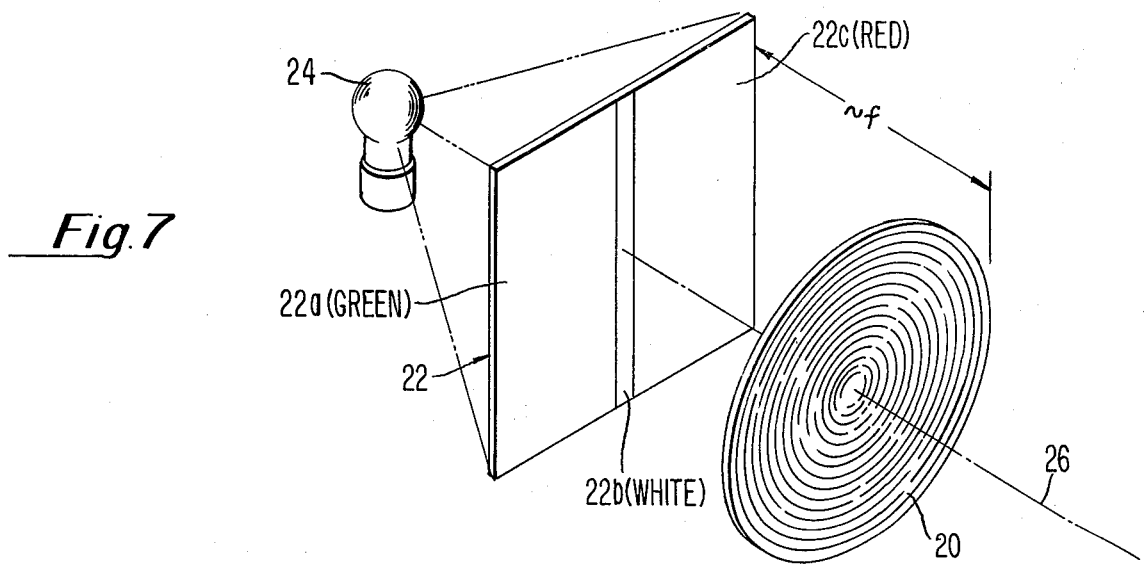
FIG. 7 is a diagrammatic illustration of another system embodiment of the present invention employing a Fresnel lens.

Utilizing the optical techniques described hereinbefore, a converging lens such as a Fresnel, may be substituted for the ribbed lenticulars. FIG. 7 illustrates in diagrammatic fashion the components of a display device using a Fresnel 20 for the lens system. In place of the set of color film strips associated with each rib of the lenticular in FIG. 1, a single translucent multi-color field member 22 is employed at approximately the distance of the focal point of the Fresnel. The color field member is backlighted by light source 24. If the color field member comprises a narrow vertically oriented central white area 22b, with green and red areas 22a and 22c on respective adjacent sides thereof, an azimuth indicator is produced which functions in much the same manner as that described hereinbefore. The optical center line 26 of the Fresnel passes through the center of the white area 22b in the color field 22. If the distant observer is on the centerline of the Fresnel, he sees the entire Fresnel lens aperture illuminated in white light. On the other hand, if the observer is to the left of the center line 26, he perceives red light and if to the right, green light.

Figure 8:
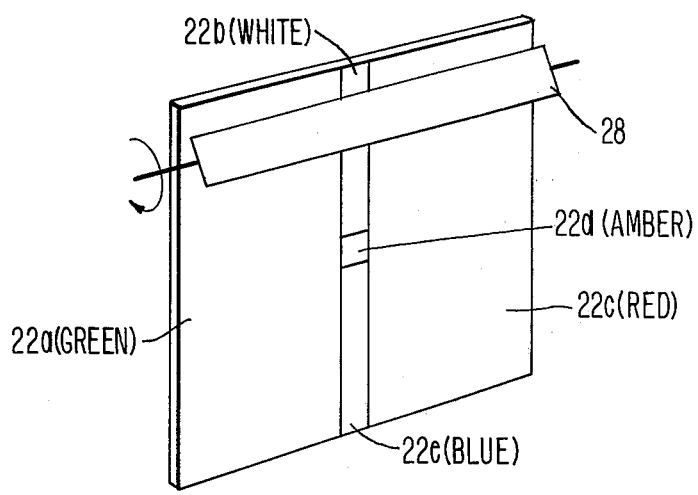
FIG. 8 is an illustration of a color field member suitable for use in the system of FIG. 7 and modified to permit both azimuth and glide slope information to be concurrently displayed.
Figure 9:
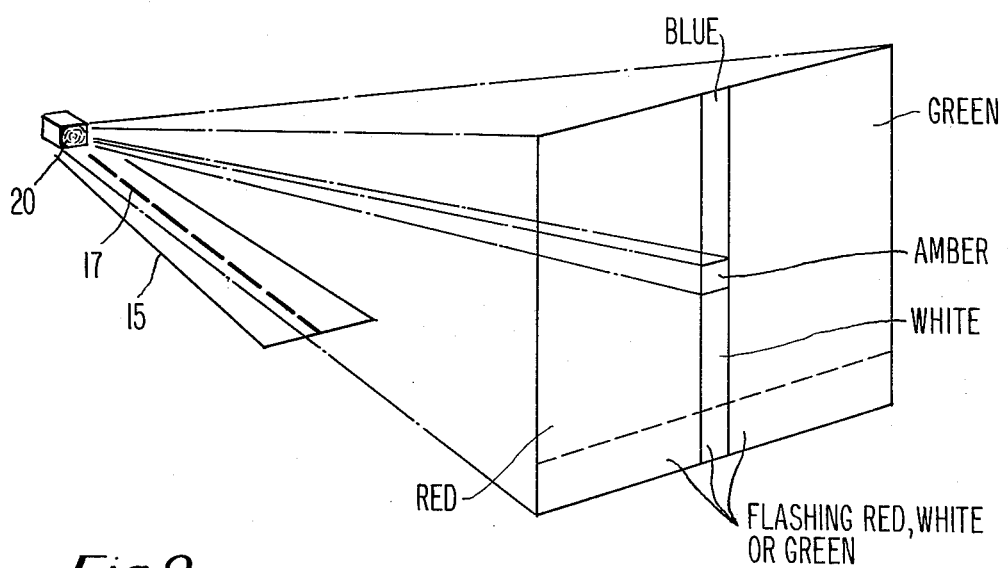
FIG. 9 is a spatial projection of the system of FIG. 4 incorporating the modified field member of FIG. 8.

The same display may be utilized to transmit both azimuth and height or glide path information concurrently, if the center white strip 22b of the color field is modified as shown in FIG. 8. The exact center of the white narrow strip 22b is colored with a small square 22d of amber pigment having a height and width equal to the width of the original narrow white strip. Above the central amber square 22d, the strip remains white, while the remaining lower portion 22e of the strip is colored blue, or some other color not appearing in the field. If this modified color field is now used with the Fresnel lens system of FIG. 7, the spatial projection of the system appears as in FIG. 9.

If the pilot of a landing aircraft approaches this lens system mounted adjacent landing area 15 from the far left (approximately 15°) he will see a totally illuminated red lens aperture. As he nears the lens centerline 26 (FIG. 7), which is aligned with the landing area centerline 17, the color of the display will suddenly change to white, blue or amber depending respectively on whether his position is low, high or very near the coaxial center line. When he overshoots the vertical center line of the central strip (22b, 22d, 22e, of FIG. 8) and deviates too far to the right of the system, he will see a green lens aperture. Thus, the pilot follows a correct glide path to the landing area 15, by maintaining substantially constant visual contact with the amber presentation of the display.

If desired, another dimension of positional information may be built into the lens system of FIG. 8 by placing a thin rotating shutter 28 operatively connected to drive means (not shown), and placed at the upper end of the color field member. This will allow the observer to see a flashing red, white or green light if he is dangerously low at any azimuth position within the system viewing angle.

From the foregoing description and mode of operation, it should be apparent that the present invention provides a simple, maintenance free, compact and relatively low cost display device which provides positional information for navigation purposes. The invention eliminates the need for modifications in, or additions to, the standard equipment carried by the vehicle being guided by the display. While practical embodiments of the invention have been presented herein, it should be understood that changes and modifications of the described arrangements may be needed to fit particular operating requirements. These changes and modifications, insofar as they are not departures from the true scope of the present invention, are intended to be covered by the claims appended hereto.

What is claimed is:

1. An optical device for providing a visual chromatic display for guiding an observer along a prescribed path of travel comprising:
   a lens system comprised of cylindrically ribbed lenticulars and having its aperture oriented toward said observer,
   a color field member positioned at substantially the focal point of said lens system, said color field member comprising a plurality of identical sets of translucent color materials arranged in a repetitive pattern and occupying homologous positions with respect to the cylindrical lenses which make up said ribbed lenticulars and with which they are respectively associated, each of said sets including a plurality of colors and having substantially the same dimensions in length and width as one of said cylindrical lenses, the longitudinal axes of said sets being parallel with the rib axes of said lenses, and a plurality of opaque vane-like members situated respectively at the interstices of adjacent sets and projecting outward toward said lenticulars, a light source positioned with respect to said color field member to provide for the back-lighting thereof, said lens system forming an image of said illuminated color field member which encompasses said entire lens aperture and which appears generally to said observer as one of said plurality of colors depending upon the observer's line of sight to said lens aperture, observation of a preselected one of said colors being indicative of the observer's alignment with said presecribed path of travel.

2. An optical device as defined in claim 1 wherein each of said sets of translucent color materials is comprised of three adjacent different color film strips, colorless transparent substrate means for mounting said film strips, the central film strip of each of said sets having its longitudinal center line aligned with the longitudinal center line of its associated cylindrical lens, the total viewing cone angle and its corresponding width dimension at a given distance from said device being a function of the width of said central film strip.

3. An optical device as defined in claim 2 wherein the rib axes of said lenticulars and the longitudinal axes of said color film strips are oriented vertically to provide azimuth guidance information to said observer.

4. An optical device as defined in claim 2 wherein the rib axes of said lenticulars and the longitudinal axes of said color film strips are oriented horizontally to provide height guidance information to said observer.

5. An optical device for providing a visual chromatic display for guiding an observer along a prescribed path of travel comprising:

a lens system comprised of a Fresnel lens and having its aperture oriented toward said observer, a color field member positioned at substantially the focal point of said lens system, said color field member comprising a multi-color sheet of translucent material which includes a narrow vertically oriented central section having in turn a centrally disposed first color area, the geometrical center of said last mentioned area lying on the optical center line of said Fresnel lens, the remaining portions of said central section contiguous to said first color area having respectively second and third colors, at least two additional sections situated respectively on opposite sides of said central section and contiguous with the longitudinal edges thereof, said last mentioned sections having respectively fourth and fifth colors, a light source positioned with respect to said color field member to provide for the back-lighting thereof, said lens system forming an image of said illuminated color field member which encompasses said entire lens aperture, the observation of said first color by said observer being indicative of the observer's alignment with said prescribed path of travel, deviations in height from said path being indicated to the observer as a change to said second or third color depending upon whether the observer is above or below said prescribed path, and deviations in azimuth from said path being indicated as a change to said fourth or fifth color depending on whether the observer is to the left or right of said path.

6. An optical device as defined in claim 5 further including a shutter-like member extending transversely across the upper portion of said color field member and adapted to be rotatably mounted to create an apparent flashing display of one of said third, fourth or fifth colors depending upon the observer's azimuth viewing angle, said flashing display being indicative of a critically low height condition.

* * * * *